July 29, 1924.

K. STAHL 1,503,386

SHOCK ABSORBER FOR AERIAL VEHICLES

Filed June 28, 1920

INVENTOR

Karl Stahl.

Patented July 29, 1924.

1,503,386

UNITED STATES PATENT OFFICE.

KARL STAHL, OF FRIEDRICHSHAFEN, GERMANY, ASSIGNOR TO LUFTSCHIFFBAU GESELLSCHAFT MIT BESCHRANKTER HAFTUNG, OF FRIEDRICHSHAFEN, GERMANY, A GERMAN CORPORATION.

SHOCK ABSORBER FOR AERIAL VEHICLES.

Application filed June 28, 1920. Serial No. 392,597.

*To all whom it may concern:*

Be it known that I, KARL STAHL, a citizen of the German Republic, residing at Friedrichshafen, Germany, have invented certain new and useful Improvements in Shock Absorbers for Aerial Vehicles, of which the following is a specification.

My invention refers to the absorption of shocks in the landing of aerial vehicles and more especially airships, and its particular object is a device designed to enable an airship descending to earth to land smoothly even in the case where no hands should be available in order to ensure a smooth landing of the cars. In accordance therewith my invention substantially consists in a buffer or shock absorber especially adapted for use in connection with airships and which is designed to be disposed at the bottom of the car, such shock absorber being substantially formed of a plurality of curved elastic rods combined so as to form a body of greater total resistivity.

In the drawings affixed to this specification and forming part thereof, the preferred form of a shock absorber according to the present invention is illustrated in a purely diagrammitic manner.

Figure 1:
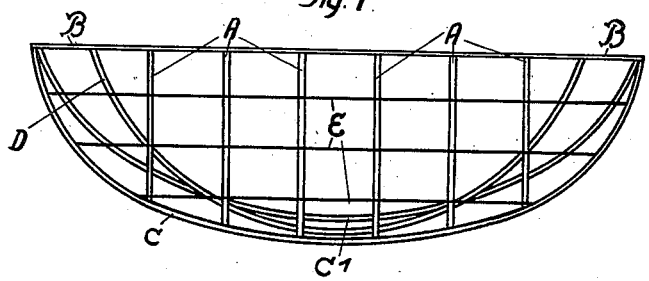
Fig. 1 is a side elevation of a buffer or shock absorber consisting of two parts, one of said parts surrounding the other.
Figure 2:
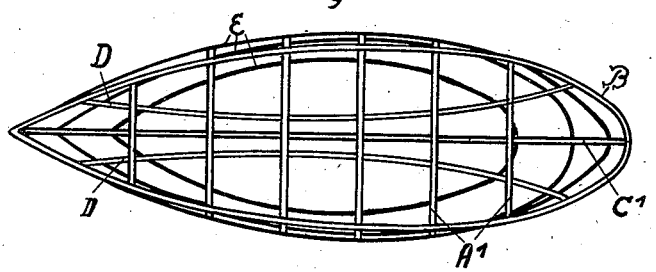
Fig. 2 is a plan view.

Referring to the drawings, the outer structure is composed of cross-girders A disposed in vertical planes in a manner similar to that of the cross-beams of a ship. The said girders have a circular form and are kept together at their upper ends by a main girder B formed in a manner most favorable with regard to the air resistance, the bottom portions being connected by a curved keel C. Auxiliary keels D and longitudinal girders E disposed in parallel to the main longitudinal girder B are provided which serve to assist the main keel C in taking up the load.

The inner structure is constructed on substantially the same principles and differently from the outer one only in so far as the number of girders is somewhat smaller.

Figure 3:
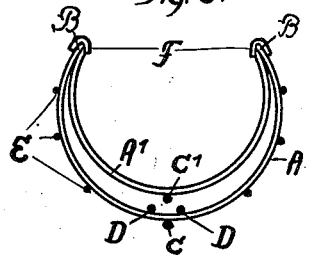
Fig. 3 is a central cross-section.

In the drawings, for the sake of clearness, merely the cross-girders $A^1$ and the keel $C^1$ of the inner structure are shown. The vertical height of the cross-girders $A^1$ is less than that of the cross-girders A (Fig. 3), so that there is formed between the two structures a certain interstice inasmuch as the main longitudinal girder B applied to the bottom of the airship car is common to both structures.

All the girders preferably consist of a light material possessing great resiliency, such as Tonkin cane, which might however be replaced by other materials having similar properties, such as solid or hollow metal bars possessing sufficient resiliency. The manner of jointing the different girders together varies according to the material employed. In the case that the girders are made of Tonkin cane the manner of jointing usually employed in the manufacture of basket-ware and more especially lacing is made use of. Special care must be taken in effecting the connection between the cross-girders and the main longitudinal girder B. In the modification disclosed in Fig. 3 this connection is protected by aid of sheet metal strips F.

The trough-shaped buffer or shock absorber illustrated in the drawings is quite especially adapted for absorbing the shocks arising in landing in an elastic way so as to render landing absolutely harmless, for not only the keels and auxiliary keels but also the cross-girders are strongly curved and are therefore enabled to develop a very considerable resiliency by momentarily bending farther. The numerous points of intersection and the outer surface curved in different directions will tend to efficiently prevent single girders from breaking. The shock absorbing action of the device will be the same no matter from what direction the shock is being taken up. The longitudinal girders E serve in the first line for keeping the shanks of the cross-girders apart and for imparting to the structure as a whole a favorable form with regard to the air resistance, and in consequence thereof they may be made weaker than the others.

In order to reduce the resistance to air as much as possible, it is preferable to envelop the buffer so as to provide it with a uniform surface of favorable qualities as far as the air resistance is concerned.

Figure 4:
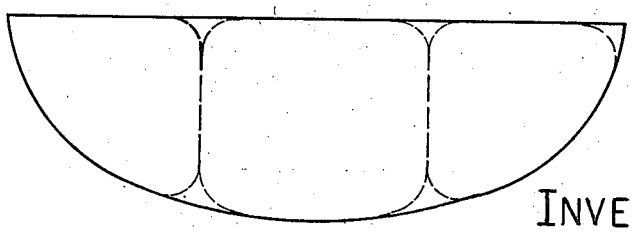
Fig. 4 is a view similar to that shown in Fig. 1, the shock absorber being here enclosed in a suitable envelope.

In order to better adapt the shock absorber to shocks of different force arising during landing, I prefer combining two or more single buffers after the way of troughs in such a manner that light shocks are absorbed by the outer structure alone, while harder shocks are taken up also by the inner structure next succeeding and so on. It is however possible also to provide the interior of the structure with an air cushion, and in employing a plurality of such air cushions one may also adjust them to different pressures, a plurality of such cushions being shown in dotted lines in Fig. 4. This latter arrangement will also prove useful in increasing the buoyancy of the car when landing on water.

I claim:—

1. The combination with an airship gondola, of a shock absorbing resilient skeleton structure formed substantially like a boat's hull and mounted below and in contact with the bottom of the gondola.

2. The combination with an airship gondola, of a shock absorbing resilient skeleton structure formed substantially like a boat's hull and mounted below and in contact with the bottom of the gondola and a second skeleton structure of smaller volume inserted in and connected with said first structure with a clearance between the bottom portions of said structure.

3. The combination with an airship gondola, of a shock absorbing resilient skeleton structure formed substantially like a boat's hull and mounted below and in contact with the bottom of the gondola and an air-cushion operatively mounted inside said structure.

4. Air craft car comprising trough-shaped shock absorber mounted underneath the car, said shock absorber comprising a plurality of curved elastic rods disposed in different planes and combined to form a structure of greater total resistivity, an enlevope covering the free surface of said structure and a plurality of air cushions disposed within said structure.

In testimony whereof I affix my signature.

KARL STAHL.